United States Patent
Frick et al.

(10) Patent No.: US 9,796,809 B2
(45) Date of Patent: Oct. 24, 2017

(54) IMPACT STRENGTH IMPROVING AGENT FOR EPOXY RESIN COMPOSITIONS

(75) Inventors: Karsten Frick, Remetschwil (CH); Jurgen Finter, Zurich (CH); Ulrich Gerber, Uitikon-Waldegg (CH); Yves Meier, Zurich (CH); Jeannette Clifford, Bremgarten (CH)

(73) Assignee: SIKA TECHNOLOGY AG, Baar (CH)

( * ) Notice: Subject to any disclaimer, the term of this patent is extended or adjusted under 35 U.S.C. 154(b) by 137 days.

(21) Appl. No.: 12/743,456

(22) PCT Filed: Nov. 21, 2008

(86) PCT No.: PCT/EP2008/065949
§ 371 (c)(1),
(2), (4) Date: May 18, 2010

(87) PCT Pub. No.: WO2009/065914
PCT Pub. Date: May 28, 2009

(65) Prior Publication Data
US 2010/0280167 A1    Nov. 4, 2010

(30) Foreign Application Priority Data
Nov. 21, 2007 (EP) ................... 07121178

(51) Int. Cl.
*C08L 63/00* (2006.01)
*C08G 59/42* (2006.01)

(52) U.S. Cl.
CPC ................ *C08G 59/4253* (2013.01)

(58) Field of Classification Search
CPC ................................. C08G 59/4253
USPC ........................................ 525/418
See application file for complete search history.

(56) References Cited

U.S. PATENT DOCUMENTS

| 4,740,539 A | * | 4/1988 | Goel ............................. 523/400 |
| 4,751,129 A | * | 6/1988 | Ramalingam et al. .... 428/195.1 |
| 6,486,256 B1 | * | 11/2002 | Tarbutton et al. .............. 525/65 |

FOREIGN PATENT DOCUMENTS

| EP | 0 303 468 | 2/1989 |
| JP | S59-196376 A | 11/1984 |
| JP | S64-66282 A | 3/1989 |
| JP | S64-087617 | 3/1989 |
| JP | H02-222444 A | 9/1990 |
| JP | H11-228669 | 8/1999 |
| JP | A-2002-053831 | 2/2002 |
| JP | 2003-128873 A | 5/2003 |

OTHER PUBLICATIONS

Office Action issued Jan. 22, 2013 in Japanese Patent Application No. 2010-534481. (English-language translation only).
Jul. 15, 2015 Office Action issued in Indian Patent Application No. 1793/KOLNP/2010.
The Dow Chemical Company, "Epoxy Novalac Resins: High-Temperature, High-Performance, Epoxy Resins," 27 pages, Oct. 1998.
Japanese Office Action dated Jan. 21, 2014 issued in Japanese Patent Application No. 2010-534481 (with translation).
Feb. 9, 2015 Office Action issued in Japanese Patent Application No. 2014-127943.
Oct. 3, 2016 Office Action issued in Japanese Patent Application No. 2010-534481.

* cited by examiner

*Primary Examiner* — Wenwen Cai
(74) *Attorney, Agent, or Firm* — Oliff PLC

(57) ABSTRACT

The present invention relates to a butadiene/acrylonitrile copolymer CTBN, modified by epoxy solid resin and terminated by carboxyl groups, the terminal epoxy groups thereof also having optionally been reacted. A polymer of this type is used in particular as an impact strength improving agent in epoxy resin compositions and has proven to be particularly advantageous for gluing on or of metal surfaces. It results in a significant reduction of the infiltration with corrosion, which in turn ensures a long-lived adhesive bond.

18 Claims, 1 Drawing Sheet

IMPACT STRENGTH IMPROVING AGENT FOR EPOXY RESIN COMPOSITIONS

FIELD OF THE INVENTION

The invention relates to the field of impact strength improvers and the field of epoxy resin compositions.

PRIOR ART

Impact strength improvers are used in order to improve the strength of adhesives under the action of impacts. In particular, although epoxy resin compositions generally have high mechanical strengths, they are very brittle, i.e. the cured epoxy resin breaks in the case of an impact, as occurs, for example, in a collision of vehicles, and thereby leads to destruction of the bond.

Liquid rubbers have been used for a relatively long time for impact modification. For example, liquid rubbers based on acrylonitrile/butadiene copolymers, as are commercially available for example under the name Hycar® from Emerald Performance Materials, LLC, USA, have been used. The use of adducts of acrylonitrile/butadiene copolymers with solid epoxy resins, as described, for example, in EP 0 308 664 B1, is additionally known.

Such known epoxy resin compositions have proven disadvantageous, in particular when used on metallic surfaces, as is the case, for example, in vehicle construction, where impact-modified epoxy resin compositions are used as adhesives or as structural foams for reinforcement in cavities in structural components, as so-called "reinforcers". One main reason for this is the insufficient aging resistance owing to resulting corrosion in the region between the substrate surface and the adhesive or the reinforcer. This so-called underfilm corrosion weakens the adhesive bond and leads to an adhesive fracture of the bond.

SUMMARY OF THE INVENTION

It is therefore an object of the present invention to provide impact strength improvers which, compared with the impact strength improvers known from the prior art in epoxy resin compositions, lead to an improvement in the impact strength and to an improvement in the corrosion resistance to underfilm corrosion and hence also to an improvement in the adhesion, in particular on metallic surfaces.

Surprisingly, it was found that this object can be achieved by the polymers described herein. The use of such polymers in epoxy resin compositions leads to substantially less underfilm corrosion and hence to a substantially stronger and longer-lasting adhesive bond, particularly in adhesive bonding to or of metallic surfaces.

BRIEF DESCRIPTION OF THE DRAWINGS

Working examples of the invention are explained in more detail with reference to the drawings. Identical elements are provided with the same reference numerals in the various figures. Of course, the invention is not limited to working examples shown and described.

Figure 1:
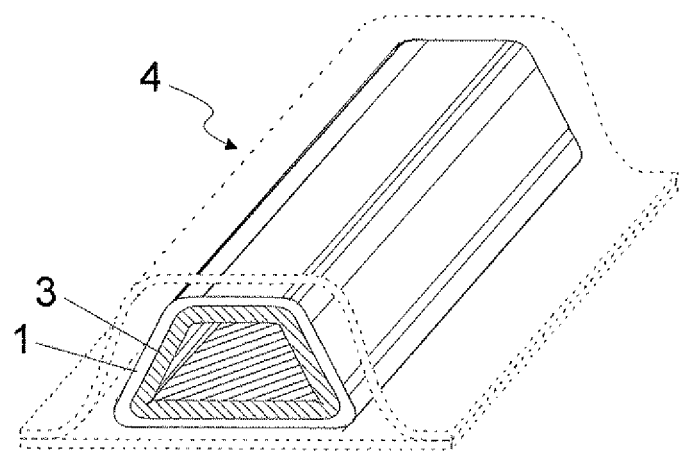
FIG. 1 shows a schematic diagram of a reinforcing part prior to foaming.

The figures show only the elements essential for the direct understanding of the invention.

PREFERRED EMBODIMENTS OF THE INVENTION

The present invention relates, in a first aspect, to a polymer of the formula (I).

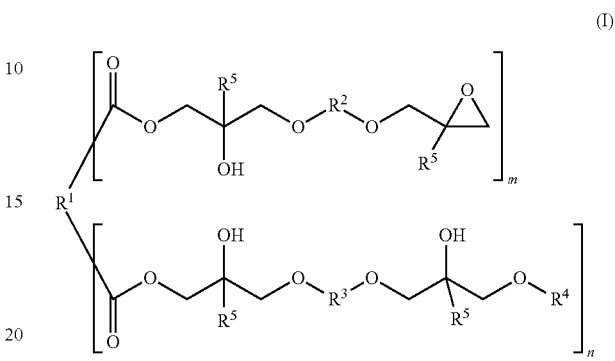

In the present document, the term "polymer" comprises firstly a group of chemically uniform macromolecules which however differ with regard to degree of polymerization, molar mass and chain length, which group was prepared by a polyreaction (polymerization, polyaddition, polycondensation). Secondly, the term also comprises derivatives of such a group of macromolecules from polyreactions, i.e. compounds which were obtained by reactions such as, for example, additions or substitutions, of functional groups on specified macromolecules and which may be chemically uniform or chemically nonuniform. The term furthermore also comprises so-called prepolymers, i.e. reactive oligomeric preadducts whose functional groups are involved in the synthesis of macromolecules.

In the present document, substance names beginning with "poly", such as, for example, polyol or polyamine, designate substances which formally contain, per molecule, two or more of the functional groups occurring in their name.

The term "solid epoxy resin" is very well known to the person skilled in the art in the epoxide sector and is used in contrast with "liquid epoxy resin". The glass transition temperature $T_G$ of the solid epoxy resins is above room temperature of 25° C., i.e. they can be comminuted at room temperature to give pourable particles.

In the present document, the term "diphenol" designates mononuclear, polynuclear and condensed aromatics and heteroaromatics which have two phenolic hydroxyl groups.

In the polymer of the formula (I), the radical $R^1$ is a divalent radical of a carboxyl-terminated butadiene/acrylonitrile copolymer CTBN after removal of the terminal carboxyl groups.

The radicals $R^2$ and $R^3$, independently of one another, are each a divalent radical of a solid epoxy resin after removal of the glycidyl ether groups.

In particular, the radicals $R^2$ and $R^3$, independently of one another, are a divalent radical of the formula (II)

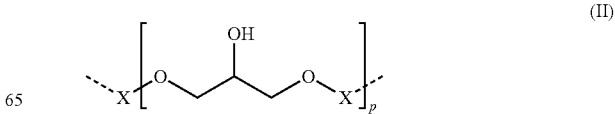

in which p has a value of ≥2, in particular from 2 to 12, preferably from 2 to 7.

The radical X, independently of one another, is in each case a divalent radical of a diphenol after removal of the two hydroxyl groups. Particularly suitable as diphenols are those selected from the group consisting of 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl) methane (=bisphenol F), bis(4-hydroxy-phenyl) sulfone (=bisphenol S), naphthoresorcinol, dihydroxynaphthalene, dihydroxyanthraquinone, dihydroxybiphenyl, 3,3-bis(p-hydroxyphenyl)-phthalides, 5,5-bis(4-hydroxyphenyl) hexahydro-4,7-methanoindane, phenol-phthalein, fluorescein, 4,4'-[bis(hydroxyphenyl)-1,3-phenylenebis(1-methyl-ethylidene)] (=bisphenol M), 4,4'-[bis(hydroxyphenyl)-1,4-phenylenebis(1-methylethylidene)] (=bisphenol P), 2,2'-diallylbisphenol A, diphenols and dicresols prepared by reacting phenols or cresols with diisopropylidenebenzene and all isomers of the abovementioned compounds.

The radical $R^4$ is an alkylaryl group or a mononuclear, polynuclear or condensed aromatic radical which, if m=0, optionally has one or more phenolic hydroxyl groups; or is a radical of the formula (III)

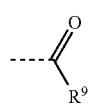

(III)

in which $R^9$ is an alkylaryl group or a mononuclear, polynuclear or condensed aromatic radical which, if m=0, optionally has one or more phenolic hydroxyl groups.

The radical $R^5$ is in each case a hydrogen atom.

m and n each have a value of 0, 1 or 2, with the proviso that (m+n)=2. In particular, both m and n each have a value of 1. Preferably, m has a value of 0 and n has a value of 2.

Polymers of the formula (I) in which m=n=1 or m=0 and n=2 have the advantage of greater storage stability compared with the polymers of the formula (I) in which m=2 and n=0. The reason for this is that the polymers where m≠2 cannot undergo chain extensions. This advantage also distinguishes these polymers in their use in epoxy resin compositions.

In particular, the radical $R^4$ is phenol, cresol, p-tert-butylphenol, cardanol (3-pentadecenylphenol (from cashew nut shell oil)), nonylphenol, hydroquinone monomethyl ether, hydroxybenzyl alcohol, and an aromatic or aliphatic carboxylic acid, such as benzoic acid, or a fatty acid, after removal of a hydroxyl group.

With the precondition that m=0 in the polymer of the formula (I), i.e. that no epoxide groups are present, the radical $R^4$ may optionally also have one or more free hydroxyl groups. In particular, in this case $R^4$ may also be a diphenol, such as, for example, phenols reacted with styrene or dicyclopentadiene, bisphenol A, bisphenol F, phenolphthalein or 4-bis(4-hydroxyphenyl)valeric acid, or, for example, also p-hydroxybenzoic acid, hydroxybenzyl alcohol or benzyl alcohol after removal of an OH group.

In the polymer of the formula (I), the radical $R^1$ is in particular a divalent radical of the formula (IV).

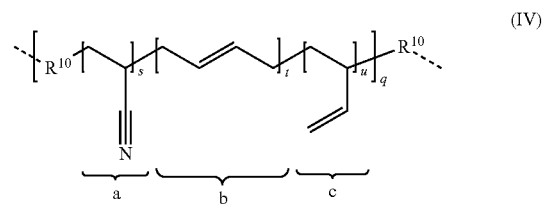

(IV)

The dashed lines here represent the bonds to the two carboxyl groups of the CTBN. a is the structural element which originates from acrylonitrile and b and c are the structural elements which originate from butadiene.

The radical $R^{10}$ is a straight-chain or branched alkylene radical having 1 to 6 C atoms, in particular having 4 C atoms, which is optionally substituted by unsaturated groups.

Furthermore, the index q has a value of from 40 to 100, in particular from 50 to 90, preferably from 52 to 66, most preferably from 54 to 52. The indices s, t and u in turn have values which describe the ratio of the structural elements a, b and c to one another. The index s has values of from 0.05 to 0.3, in particular from 0.1 to 0.25, preferably from 0.1 to 0.2, most preferably from 0.1 to 0.18, the index t has values of from 0.5 to 0.8, in particular from 0.6 to 0.7, the index u has values of from 0.1 to 0.2, in particular from 0.13 to 0.15, with the proviso that the sum of s, t and u is equal to 1.

It is clear to the person skilled in the art that the structure shown in formula (IV) is to be understood as being a simplified representation. Thus, the structural elements which are designated by a, b and c can be arranged in each case randomly, alternately or blockwise relative to one another.

In particular, $R^1$ is a radical that is obtainable after the formal removal of the carboxyl groups from a carboxyl-terminated butadiene/acrylonitrile copolymer CTBN commercially distributed under the trade name Hycar® CTBN by Emerald Performance Materials, LLC, USA.

Polymers of the formula (I) according to the invention, as have been described above, typically have a solid state of aggregation at room temperature. This considerably facilitates the handling of such polymers compared with polymers which are liquid or even viscous at room temperature.

In a second aspect, the invention comprises a process for the preparation of a polymer of the formula (I) as was described above. A carboxyl-terminated polymer of the formula (V) is reacted with a solid epoxy resin of the formula (VI)

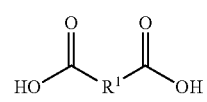

(V)

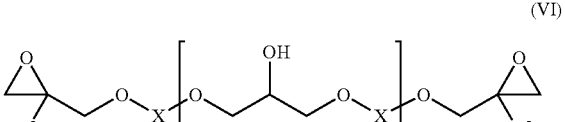

(VI)

in which the radicals $R^1$, $R^5$ and X and the index p have already been described above.

It is essential for the invention that the carboxyl-terminated polymer of the formula (V) is reacted with a solid epoxy resin and not with a liquid epoxy resin, i.e. that the radicals $R^2$ and $R^3$ in the polymer of the formula (I) accordingly are, independently of one another, solid epoxy resins after removal of the two glycidyl groups. The use of butadiene/acrylonitrile copolymers CTBN modified with liquid epoxy resin leads only to a marginal reduction in the underfilm corrosion in the case of adhesive bonds to or of metallic surfaces. In contrast, the use of butadiene/acrylonitrile copolymers CTBN modified according to the invention with solid epoxy resin surprisingly leads to a dramatic reduction in the underfilm corrosion.

The polymer of the formula (I) is prepared by reacting the carboxyl-terminated polymer of the formula (V) with a stoichiometric excess of the solid epoxy resin of the formula (VI).

The molar ratio of the epoxide groups of the solid epoxy resin to the carboxyl groups of the butadiene/acrylonitrile copolymer CTBN is ≥2:1, preferably from 3:1 to 10:1. This ensures that all carboxyl groups have reacted with epoxide groups. At the same time, the formation of polymers having molecular weights of more than 20 000 daltons is also prevented.

For the preparation of polymers of the formula (I), in which n≠0, i.e. the epoxide groups of the polymer of the formula (I) are at least partly reacted with compounds of the formula (VII), a smaller excess of epoxide groups can be employed.

$$HO—R^4 \quad (VII)$$

The radical $R^4$ has already been described above.

The preparation of a polymer of the formula (I), in which n≠0, can be effected stepwise, for example via the preparation of a polymer of the formula (I) in which m=2 and n=0, and subsequent at least partial reaction with a compound of the formula (VII), or in a so-called one-pot process where the carboxyl-terminated polymer of the formula (V), the solid epoxy resin of the formula (VI) and the compound of the formula (VII) are reacted together.

Preferably, the polymer of the formula (I) where n≠0 is prepared stepwise, the solid epoxy resin of the formula (VI) being reacted at one end with a compound of the formula (VII) before the reaction with the carboxyl-terminated polymer of the formula (V).

Such reactions of epoxides or glycidyl ethers with carboxylic acids and the reaction conditions therefor are known to the person skilled in the art. In particular, the reaction takes place under an inert atmosphere at relatively high temperatures, typically above 100° C., preferably at about 140° C., and optionally with the use of catalysts. Examples of such catalysts are triphenylphosphine, tertiary amines, quaternary phosphonium salts or quaternary ammonium salts.

In a further aspect, the present invention comprises the use of a polymer of the formula (I), described above, as an impact strength improver in a polymer matrix.

In the present document, "impact strength improvers" are understood as meaning substances or compounds which are used in a polymer matrix in order to impart to this polymer matrix the ability to absorb collision and impact energy without breaking or suffering any other damage, or to improve said ability of this polymer matrix.

These polymers of the formula (I) are preferably used in crosslinking compositions, in particular in systems in which these polymers can undergo reaction. Thus, the question regarding in which compositions these polymers are used is dependent in particular on the polymer matrix. Accordingly, polymers of the formula (I) which are terminated by epoxide groups are preferably used in epoxy resin compositions.

In a further aspect, the invention starts from a composition comprising
a) at least one polymer of the formula (I), as described above;
b) at least one solid epoxy resin EP; and
c) at least one curing agent H for epoxy resins.

Suitable solid epoxy resins EP are in particular solid epoxy resins of the formula (VI), the substituent $R^5$ and the index p having already been described above.

Preferred solid epoxy resins EP have a glass transition temperature $T_G$ of ≥25° C., in particular of ≥30° C., can be typically prepared from the reaction of compounds of the formula HO—X—OH with epichlorohydrin and/or 2-methylepichlorohydrin, X already having been described above. It is clear to the person skilled in the art that X in the polymer of the formula (I) and solid epoxy resin EP can be selected, independently of one another, from the group described.

Such solid epoxy resins EP are, for example, commercially available under the trade name Araldite® GT 7071 or Araldite® GT 7004 from Huntsman International, LLC, USA. Further suitable solid epoxy resins EP are, for example, commercially available from The Dow Chemical Company, USA, or from Hexion Specialty Chemicals Inc., USA.

Furthermore, modified solid epoxy resins, in particular fatty acid-modified solid epoxy resins, may be used, as are commercially available, for example under the trade name Araldite® GT 6404 from Huntsman International, LLC, USA.

The proportion of the solid epoxy resin EP is preferably from 30 to 90% by weight, in particular from 35 to 85% by weight, preferably from 40 to 75% by weight, based on the total weight of the composition.

Furthermore, the composition comprises in particular at least one curing agent H for epoxy resins.

The curing agent H contains in particular groups reactive toward epoxide groups and is present in blocked form or in crystalline form as a compound which is sparingly soluble in epoxides. Preferably, the curing agent H is activated by elevated temperature.

Examples of suitable curing agents H are amines, such as aliphatic, cycloaliphatic, aromatic or araliphatic, preferably primary or secondary, amines and polyamines; adducts and polyalkoxylation products of polyamines; amine-terminated polyalkylene glycols; polyphenols, such as phenol or cresol novolacs, adducts of monophenols or polyphenols with polyamides; polyamides, in particular those which are derived from aliphatic polyamines and dimerized or trimerized fatty acids; polysulfides; aniline-formaldehydes; polyhydric phenols; polybasic carboxylic acids and their anhydrides.

Preferred curing agents H are selected from the group consisting of dicyandiamide, guanamine, guanidine, aminoguanidine and derivatives thereof.

Furthermore, curing agents having an accelerating effect, such as substituted ureas, for example 3-(3-chloro-4-methylphenyl)-1,1-dimethylurea (chlortoluron), or phenyl-dimethylureas, in particular 3-(p-chlorophenyl)-1,1-dimethylurea (monuron), 3-phenyl-1,1-dimethylurea (fenuron) or 3-(3,4-dichlorophenyl)-1,1-dimethylurea (diuron), are possible. Furthermore, compounds of the class consisting of the imidazoles, imidazolines and amine complexes may be used.

The curing agent H is particularly preferably dicyandiamide.

The curing agent H is preferably used in a stoichiometric amount, based on the epoxide groups in the composition. The molar ratio of the epoxide groups to the active hydrogen of the curing agent H is preferably from 0.8 to 1.2, in particular from 0.9 to 1.1, preferably from 0.95 to 1.05.

In particular, the proportion of the curing agent H is from 0.05 to 30% by weight, in particular from 0.1 to 15% by weight, preferably from 0.2 to 5% by weight, based on the total weight of the composition.

Furthermore, the composition may additionally contain at least one liquid epoxy resin. Preferred liquid epoxy resins have the formula (VII)

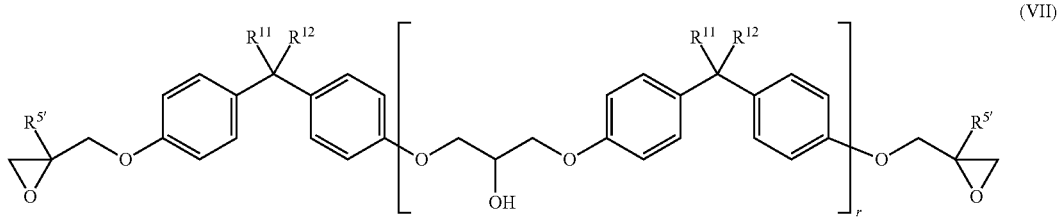

Here, the radicals $R^{5'}$, $R^{11}$ and $R^{12}$, independently of one another, are either H or $CH_3$. Furthermore, the index r has a value of from 0 to 1. Preferred liquid epoxy resins have a value r of ≤0.2.

These are preferably diglycidyl ethers of bisphenol A (BADGE), of bisphenol F (BFDGE) and of bisphenol A/F. The designation "A/F" here refers to a mixture of acetone with formaldehyde, which mixture is used as a starting material in the preparation thereof. Such liquid resins are commercially available, for example, under the trade names Araldite® GY 250, Araldite® PY 304, Araldite® GY 282 from Huntsman International, LLC, USA, or D.E.R.® 331 or D.E.R.® 330 from The Dow Chemical Company, USA, or under the trade name Epikote® 828 or Epikote® 862 from Hexion Specialty Chemicals Inc., USA.

Furthermore, the composition may additionally contain at least one phenol resin having epoxide groups. Phenol resins which are prepared from a polycondensation reaction of phenol or cresol with formaldehyde in a stoichiometric ratio of phenol to formaldehyde of a ≥1:1, in particular from 1.2:1 to 2:1, with the use generally of acidic catalysts, and subsequent reaction of the resulting polyphenol (also referred to as novolac) with epichlorohydrin and/or 2-methylepichlorohydrin are preferred.

Such polyphenols or novolacs having epoxide groups are commercially available, for example, under the trade names D.E.N.™ 431 and D.E.N.™ 438 from The Dow Chemical Company, USA.

Advantageously, the proportion of the liquid epoxy resin or of the phenol resin is from 0.1 to 20% by weight, preferably from 0.1 to 15% by weight, in particular from 0.1 to 5% by weight, based on the total weight of the composition.

The composition may additionally contain chemical or physical blowing agents. Organic or inorganic substances which form or eliminate gaseous substances under the influence of temperature, moisture, electromagnetic radiation or chemicals are designated as chemical blowing agents. Such substances are in particular azodicarbonamides, sulfohydrazides, bicarbonates or carbonates. Physical blowing agents which may be used are compounds which are transformed into the gaseous state of aggregation on change of temperature, of pressure or of volume, in particular on increase in temperature, and thus form a foam structure by volume expansion. In particular, such physical blowing agents are liquids which vaporize at elevated temperature. Furthermore, gases or low-boiling liquids, which are introduced in microencapsulated form into the composition, can be used as physical blowing agents. Both chemical and physical blowing agents are capable of producing foam structures in polymer compositions.

Preferred blowing agents are chemical blowing agents which lead to foaming of the composition under the influence of temperature. The heat required for the foaming can be introduced by external heat sources, such as, for example, storage in an oven, contact with electrical heating elements, microwave radiation, induction heating and the like, or by internal heat sources, such as, for example, by an exothermic chemical reaction.

Suitable blowing agents are, for example, commercially available under the trade name Expancel® from Akzo Nobel, the Netherlands, under the trade name Celogen® from Chemtura Corp., USA, or under the trade name Luvopor® from Lehmann & Voss & Co. KG, Germany.

The composition may furthermore contain additional solid toughness improvers. Here and below, a "toughness improver" is understood as meaning an addition to an epoxy resin matrix which results in a substantial increase in the toughness even with small additions of from 0.1 to 15% by weight, in particular from 0.5 to 8% by weight, based on the total weight of the composition, and is therefore capable of absorbing higher flexural, tensile, impact or collision stresses before the matrix tears or breaks.

Such solid toughness improvers are, for example, organic ion-exchanged layered minerals as are known to the person skilled in the art by the terms organoclay or nanoclay; block copolymers, in particular of the monomers styrene, butadiene, acrylonitrile and methyl methacrylate; amorphous silica; or core-shell polymers. In particular, the solid toughness improver is a core-shell polymer.

Core-shell polymers consist of a resilient core polymer (core) and a rigid shell polymer (shell). Particularly suitable core-shell polymers consist of a core comprising resilient acrylate or butadiene polymer which is surrounded by a rigid shell of a rigid thermoplastic polymer.

Preferred core-shell polymers are so-called MBS polymers, which are commercially available under the trade names Clearstrength® from Arkema, Inc., USA, Paraloid® from Rohm and Haas Co., USA, or F-351™ from Zeon Chemicals L.P., USA.

Core-shell polymer particles which are already present as a dried polymer latex are particularly preferred. Examples of these are GENIOPERL® M23A from Wacker Chemie AG, Germany, having a polysiloxane core and acrylate shell, radiation-crosslinked rubber particles of the NEP series, produced by Eliokem, Inc., USA, or Nanopren® from Lanxess AG, Germany, or Paraloid® EXL from Rohm and Haas Co., USA.

Further comparable examples of core-shell polymers are offered under the trade name Albidur® by Nanoresins AG, Germany.

Advantageously, the proportion of the solid core-shell polymer is from 0.1 to 15% by weight, preferably from 0.1 to 8% by weight, in particular from 0.1 to 5% by weight, based on the total weight of the composition.

Furthermore, the composition may additionally comprise at least one filler. This is preferably a filler which is selected from the group consisting of carbon black, mica, talc, kaolin, wollastonite, feldspar, syenite, chlorite, phyllosilicates, such as, for example, bentonites or montmorillonites, calcium carbonate (precipitated or ground), dolomite, quartz, silicas (pyrogenic or precipitated), cristobalite, calcium oxide, aluminum hydroxide, magnesium oxide, hollow ceramic spheres, hollow glass spheres, hollow organic spheres, glass spheres, colored pigments, glass fibers, plastic fibers and carbon fibers. Fillers are understood as meaning both the organically modified and the untreated commercially available forms known to the person skilled in the art.

Advantageously, the proportion of the filler is from 3 to 50% by weight, preferably from 5 to 40% by weight, in particular from 8 to 35% by weight, based on the total weight of the composition.

Furthermore, the composition may contain unreactive thermoplastic polymers, such as, for example, homo- or copolymers of unsaturated monomers, in particular of unsaturated monomers which are selected from the group consisting of ethylene, propylene, butylene, isobutylene, isoprene, vinyl acetate or higher esters thereof and (meth) acrylate, ethylene-vinyl acetate copolymers (EVA), atactic poly-α-olefins (APAO), polypropylenes (PP) and polyethylenes (PE) being particularly suitable.

Further suitable unreactive thermoplastic polymers are polyesters, polyamides, polystyrene, polymethyl methacrylate, thermoplastic polyurethanes or polyether esters, as are commercially available, for example, under the trade name Hytrel® from DuPont, USA.

The composition may comprise further constituents, in particular catalysts, reactive diluents, heat and/or light stabilizers, thixotropic agents, plasticizers, solvents, dyes and pigments.

Compositions as described above are suitable, for example, as adhesives, sealants or as compositions for the production of coatings, in particular as structural adhesives.

Furthermore, the compositions according to the invention are suitable as foamable, heat-curing compositions which are used as structural foams in bulkhead parts for sealing and/or sound insulation or as reinforcing parts for reinforcement in cavities in structural components and reinforcing elements, in particular in vehicle construction. Such systems are known to the person skilled in the art by the terms "baffle" and "reinforcer".

Particularly for use as foamable, heat-curing material for baffle and reinforcer applications, the compositions according to the invention have proven particularly advantageous since they have very good adhesion to metallic surfaces and, in their aging behavior, have a general increase in the resistance to corrosion, in particular to underfilm corrosion.

Figure 2:
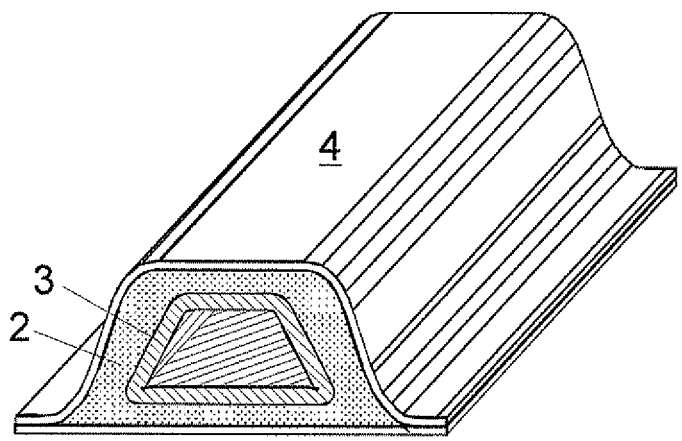
FIG. 2 shows a schematic diagram of a reinforcing part after foaming.

FIGS. 1 and 2 schematically show a use example of the present invention according to the above description.

FIG. 1 shows a reinforcer as used in a cavity of a structural component 4, before the foaming of the composition 1 which is foamable in this embodiment and is present on a support part 3. In vehicle construction, such reinforcers are used in the assembly of the bodywork at points which are subsequently exposed to particularly high loads and, for example, are fastened to the bodywork by means of a clip or the like. On curing of the cathodic dip-coating (CDC) in an oven, the foamable composition foams, adheres to said component and then cures completely.

FIG. 2 shows a reinforcer as used in a cavity of a structural component 4. In this case, the foamable material 2 has already completely foamed and completely fills the cavity between the support part 3 and the structural component 4.

EXAMPLES

Preparation of the Polymers P1 to P6

For the preparation of the polymers P1 to P6 corresponding to the formula (I), Hycar® 1300X13 CTBN ("X13") or Hycar® 1300X8 CTBN ("X8") was reacted with Cardolite® NC 700 (=Cardanol; "NC 700"), Araldite® GT 7071 ("GT 7071") and optionally with the liquid epoxy resin ("BFDGE"), the polyphenol having epoxide groups ("D.E.N 431") and/or the bisphenol A in the proportions by weight stated in table 1 for 10 hours at 120° C. with addition of a catalyst (PPh$_3$). The reaction was stopped after an epoxide equivalent weight (EEW) of 2000 g/eq was reached.

TABLE 1

Preparation of the polymers P1 to P6 of the formula (I).

| | P1 | P2 | P3 | P4 | P5 | P6 |
|---|---|---|---|---|---|---|
| X13 | 24.99 | 39.98 | | | 24.99 | 24.99 |
| X8 | | | 24.99 | 24.99 | | |
| GT 7071 | 59.97 | 59.97 | 59.97 | 39.98 | 39.98 | 72.18 |
| D.E.N. 431 | | | | | 19.99 | |
| BFDGE | | | | 19.99 | | |
| PPh$_3$ | 0.05 | 0.05 | 0.05 | 0.05 | 0.05 | 0.05 |
| N 700 | 14.99 | | 14.99 | 14.99 | 14.99 | |
| Bisphenol A | | | | | | 2.78 |
| Total | 100 | 100 | 100 | 100 | 100 | 100 |
| EEW [g/eq] | 1920 | 1100 | 2270 | 770 | 830 | 980 |

Preparation of the Compositions Z1 to Z6

The polymers P1 to P6 were mixed with the solid epoxy resin Araldite® GT 7004 ("GT 7004") or Araldite® GT 7071 ("GT 7071") in the proportions by weight stated in table 2. Thereafter, the additional substances listed in table 2 were added in the corresponding proportions by weight and mixed in an extruder.

Preparation of the Compositions Ref1 to Ref3

As reference examples Ref1 to Ref3, compositions without polymer corresponding to the formula (I) were prepared by a procedure in which the substances listed in table 2 were added in the corresponding proportions by weight and mixed in an extruder.

TABLE 2

Preparation of the compositions Z1 to Z6 and of the compositions Ref1 to Ref3:

|  | Z1 | Z2 | Z3 | Z4 | Z5 | Z6 | Ref1 | Ref2 | Ref3 |
|---|---|---|---|---|---|---|---|---|---|
| P1 | 14.2 |  |  |  |  |  |  |  |  |
| P2 |  | 14.2 |  |  |  |  |  |  |  |
| P3 |  |  | 14.2 |  |  |  |  |  |  |
| P4 |  |  |  | 13.9 |  |  |  |  |  |
| P5 |  |  |  |  | 14.2 |  |  |  |  |
| P6 |  |  |  |  |  | 14.2 |  |  |  |
| GT 7004 | 59.9 | 59.8 | 59.9 | 58.5 | 59.8 | 59.8 | 66.1 |  |  |
| GT 7071 |  |  |  |  |  |  |  | 80.3 | 75.1 |
| Epoxysilane[1] | 0.7 | 0.7 | 0.7 | 0.7 | 0.7 | 0.7 |  |  |  |
| EP-CTBN[2] |  |  |  |  |  |  | 16.5 |  |  |
| DICY[3] | 1.2 | 1.3 | 1.2 | 1.4 | 1.4 | 1.4 | 1.3 | 2 | 1.8 |
| Fillers | 20.2 | 20.2 | 20.2 | 19.7 | 20.2 | 20.2 | 13.2 | 15.1 | 20.8 |
| Blowing agent | 0.4 | 0.4 | 0.4 | 0.4 | 0.4 | 0.4 | 0.3 | 0.4 | 0.4 |
| $SiO_2$ | 3.0 | 3.0 | 3.0 | 5.1 | 3.0 | 3.0 | 2.5 | 2 | 1.7 |
| Catalyst | 0.3 | 0.3 | 0.3 | 0.3 | 0.3 | 0.3 | 0.2 | 0.2 | 0.2 |
| Total | 100 | 100 | 100 | 100 | 100 | 100 | 100 | 100 | 100 |
| TSS H0 [MPa] | 5.0 | 3.5 | 2.9 | 4.8 | 8.4 | 8.1 | 10.5 | 6.6 | 5.9 |
| TSS H7 [MPa] | 3.8 | 3.5 | 3.4 | 3.6 | 6.9 | 6.3 | 3.1 | 1.3 | 0 |
| Change in TSS [%] | −24 | −2 | +15 | −24 | −18 | −22 | −71 | −80 | −100 |

[1] 3-Glycidyloxypropyltrimethoxysilane;
[2] EP-CTBN = Hycar® 1300X13 CTBN modified with liquid epoxy resin;
[3] Dicyandiamide Description of the Test Methods The tensile shear strength ("TSS") was determined on the basis of ISO 4587/DIN EN 1465 on a Zwick/Roell Z005 tensile tester, in each case two identical substrates being adhesively bonded to one another (adhesion area: 25×20 mm; layer thickness: 2 mm; measuring rate: 10 mm/min; substrates: hot-galvanized steel 61010 (HLE, HE450M), 100×25×1.8 mm; curing: 30 min at 180° C.; measurement temperature: 23° C. (unless stated otherwise)).

The first measurement of the tensile shear strength ("TSS H0") was carried out after curing of the composition. A second measurement ("TSS H7") was carried out after storage of the test specimen for 7 days at 70° C. and 100% relative humidity (cataplasma storage). The change in the tensile shear strength after cataplasma storage ("TSS H7") relative to the tensile shear strength after curing ("TSS H0") is stated in %.

The fracture patterns were analyzed visually, the trend in the visually determined corrosion on the substrates corresponding to the results of the measurement of the tensile shear strengths. In the case of the formulations Ref1 to Ref3 not according to the invention, considerable underfilm corrosion was found on the substrates and led in some cases to spontaneous adhesive failure of the adhesive bond (TSS H7=0). The compositions Z1 to Z6 according to the invention showed a cohesive fracture pattern without signs of corrosion on the substrates.

Results

The results of the determination of the tensile shear strengths are shown in table 2. They show that the decrease in the tensile shear strength in the case of the examples according to the invention after the cataplasma storage is substantially smaller compared with that in the case of the reference examples Ref1 to Ref3 without polymer of the formula (I), or that even in isolated cases, a higher tensile shear strength was measured after cataplasma storage. The smaller decrease in adhesion in the case of the examples according to the invention is attributable to the lower underfilm corrosion.

LIST OF REFERENCE NUMERALS 1 foamable composition
2 foamed composition
3 support material
4 structural component

The invention claimed is:

1. A mixture of polymers, wherein the mixture of polymers comprises at least one polymer of the formula (I)

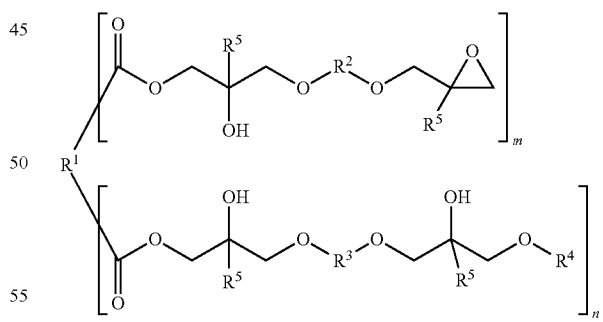

(I)

in which $R^1$ is a divalent radical of a carboxyl-terminated butadiene/acrylonitrile copolymer CTBN after removal of the terminal carboxyl groups;
one of $R^2$ or $R^3$ is a divalent radical of a bisphenol A-based solid epoxy resin after removal of the terminal glycidyl ether groups, and the other one of $R^2$ or $R^3$ is radical of a liquid resin having the formula:

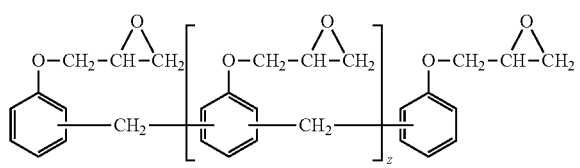

wherein z is 0.2-0.7,
after removal of the terminal glycidyl ether groups;
$R^4$ is a radical of bisphenol A;
$R^5$ is in each case a hydrogen atom; and
m has a value of 0 or 1, and n has a value of 1 or 2, with the proviso that (m+n) =2.

2. The mixture of polymers as claimed in claim 1, wherein $R^1$ has the formula (IV)

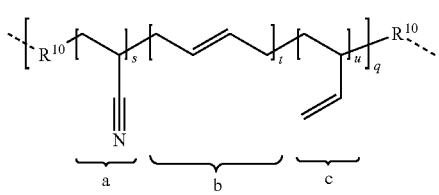

(IV)

in which the dashed lines represent the bonding sites of the two carboxyl groups;
a is the structural element which originates from acrylonitrile and b and c are the structural elements which originate from butadiene;
$R^{10}$ is a straight-chain or branched alkylene radical having 1 to 6 C atoms, which is optionally substituted by unsaturated groups;
q has a value of from 40 to 100;
s has a value of from 0.05 to 0.3;
t has a value of from 0.5 to 0.8;
u has a value of from 0.1 to 0.2;
with the proviso that (s+t+u) =1.

3. The mixture of polymers as claimed in claim 2, wherein
q has a value of from 52 to 66;
s has a value of from 0.1 to 0.25;
t has a value of from 0.6 to 0.7;
u has a value of from 0.13 to 0.15;
with the proviso that (s+t+u) =1.

4. The mixture of polymers as claimed in claim 1, wherein in the mixture of polymers, in at least one polymer, n is 2.

5. The mixture of polymers as claimed in claim 1, wherein the mixture of polymers is solid at room temperature.

6. The mixture of polymers as claimed in claim 1, wherein, in the mixture of polymers, in at least one polymer, m is 1.

7. The mixture of polymers as claimed in claim 1, wherein the divalent radical of the bisphenol A-based solid epoxy resin is a divalent radical of the formula (II)

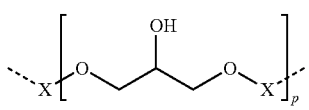

(II)

wherein p has a value of ≥2, and X is a divalent radical of bisphenol A after removal of the hydroxyl groups.

8. A mixture of polymers formed by reacting at least one carboxyl-terminated butadiene/acrylonitrile copolymer CTBN, at least one bisphenol A-based solid epoxy resin having terminal glycidyl ether groups, a liquid resin having the following formula, and bisphenol A

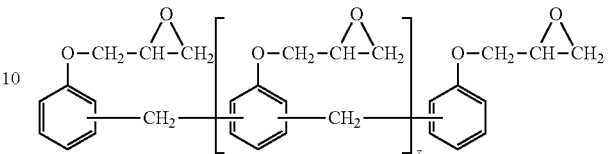

wherein z is 0.2-0.7, in which the molar ratio of the epoxide groups of the solid epoxy resin and the liquid resin to the carboxyl groups of the butadiene/acrylonitrile copolymer CTBN is ≥2:1.

9. A process for the preparation of the mixture of polymers as claimed in claim 1 by reacting a carboxyl-terminated polymer of the formula (V) with a solid epoxy resin of the formula (VI), a liquid resin of the formula (VIII) and bisphenol A

(V)

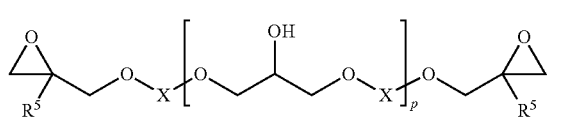

(VI)

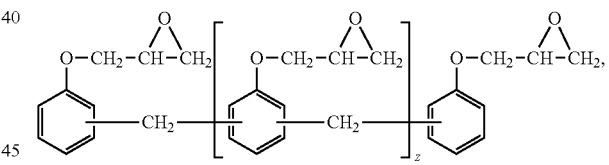

(VIII)

wherein z is 0.2-0.7, in which the molar ratio of the epoxide groups of the solid epoxy resin and the liquid resin to the carboxyl groups of the butadiene/acrylonitrile copolymer CTBN is ≥2:1.

10. A polymer matrix comprising the mixture of polymers as claimed in claim 1 as an impact strength improver.

11. The polymer matrix as claimed in claim 10, wherein the polymer matrix is an epoxy resin matrix.

12. A composition comprising
a) the mixture of polymers as claimed in claim 1;
b) at least one solid epoxy resin EP; and
c) at least one curing agent H for epoxy resins.

13. The composition as claimed in claim 12, wherein the solid epoxy resin EP can be prepared by reacting compounds of the formula HO—X—OH with epichlorohydrin and/or 2-methylepichlorohydrin,
in which X in each case is a divalent radical of a diphenol after removal of the hydroxyl groups.

14. The composition as claimed in claim 12, wherein the curing agent H for epoxy resins is activated by elevated temperature.

15. The composition as claimed in claim 12, wherein the curing agent H for epoxy resins contains dicyandiamide.

16. The composition as claimed in claim 12, wherein the composition additionally comprises at least one solid toughness improver.

17. The composition as claimed in claim 12, wherein the composition additionally contains further constituents selected from the group consisting of blowing agent, filler, unreactive thermoplastic polymers, catalysts, reactive diluents, heat and/or light stabilizers, thixotropic agent, plasticizer, solvent, dyes and pigments.

18. The composition as claimed in claim 12, wherein the composition is a structural adhesive and/or a foamable, heat-curing composition for reinforcement in cavities of structural components and reinforcing elements.

* * * * *